(12) United States Patent
Rogers et al.

(10) Patent No.: US 6,254,950 B1
(45) Date of Patent: Jul. 3, 2001

(54) POLYESTER PHENYLENEDI (OXYACETIC ACID) COPOLYESTER BLENDS HAVING IMPROVED GAS BARRIER PROPERTIES

(75) Inventors: Martin E. Rogers, Blountsville; Robert B. Barbee; David R. Fagerburg, both of Kingsport, all of TN (US); Timothy E. Long, Blacksburg, VA (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/332,829

(22) Filed: Jun. 14, 1999

Related U.S. Application Data

(60) Provisional application No. 60/089,391, filed on Jun. 15, 1998, provisional application No. 60/089,221, filed on Jun. 15, 1998, and provisional application No. 60/089,220, filed on Jun. 15, 1998.

(51) Int. Cl.$^7$ ....................................................... C08L 67/02
(52) U.S. Cl. ..................... 428/36.92; 428/35.7; 525/437; 525/444; 525/448
(58) Field of Search .................................... 525/444, 437, 525/448; 428/36.92, 35.7

(56) References Cited

U.S. PATENT DOCUMENTS

| | | |
|---|---|---|
| 4,238,625 | 12/1980 | Fiege et al. . |
| 4,440,922 | 4/1984 | Barbee et al. . |
| 4,552,948 | 11/1985 | Barbee et al. . |
| 4,663,426 | 5/1987 | Wicker, Jr. et al. . |
| 4,935,540 | 6/1990 | Summer, Jr. . |
| 4,959,421 | 9/1990 | Hirahara et al. . |
| 5,030,705 | 7/1991 | Hirahara et al. . |
| 5,239,045 | 8/1993 | Hirahara et al. . |

FOREIGN PATENT DOCUMENTS

| | | |
|---|---|---|
| 0 335 594 | 10/1989 | (EP) . |
| 3204833 | 9/1991 | (JP) . |
| 4091052 | 3/1992 | (JP) . |
| 4173765 | 6/1992 | (JP) . |
| 5-295241 | 9/1993 | (JP) . |
| 05295241 | * 11/1993 | (JP) . |

* cited by examiner

*Primary Examiner*—Patricia A. Short
(74) *Attorney, Agent, or Firm*—Karen A. Harding; Bernard J. Graves, Jr.

(57) ABSTRACT

This invention relates to polyester compositions that possess improved gas barrier properties. The novel copolyester blends comprise repeat units of phenylenedi(oxyacetic acid). Such copolyesters with improved gas barrier properties are useful in packaging applications where low gas permeability are required for protection or preservation of the contents.

31 Claims, No Drawings

POLYESTER PHENYLENEDI (OXYACETIC ACID) COPOLYESTER BLENDS HAVING IMPROVED GAS BARRIER PROPERTIES

CROSS-REFERENCE TO RELATED APPLICATIONS

This application claims the benefit of U.S. Provisional Applications No. 60/089,391, filed Jun. 15, 1998, No. 60/089,221, filed Jun. 15, 1998, and No. 60/089,220, filed Jun. 15, 1998, which applications are all hereby incorporated in their entireties by this reference.

FIELD OF THE INVENTION

This invention relates to polyester compositions that possess improved gas barrier properties. The novel copolyester blends comprise repeat units of phenylyenedi (oxyacetic acid). Such copolyesters with improved gas barrier properties are useful in packaging applications where low gas permeability are required for protection or preservation of the contents.

BACKGROUND OF THE INVENTION

Phenylenedi(oxyacetic acid) can be prepared by several methods. U.S. Pat. Nos. 4,238,625 and 4,935,540 describe one method of preparing phenylenedi(oxyacetic acid) through the oxidation of aryloxyethanols. JP 3204833, JP 4091052 and JP 4173765 describe the preparation of phenylenedi(oxyacetic acid) from resorcinol and chloroacetic acid.

U.S. Pat. No. 4,440,922 describes the polyester homopolymers made from phenylenedi(oxyacetic acid). However, homopolymers made from phenylenedi(oxyacetic acid) are amorphous and have low glass transition temperatures making these polyesters difficult to dry. They polyesters have low elongations and are consequently brittle. In general, homopolymers made from phenylenedi(oxyacetic acid) are unsuitable for use in rigid containers.

U.S. Pat. Nos. 4,440,922, 4,552,948, 4,663,426, and 5,030,705 describe the use of copolyesters containing phenylenedi(oxyacetic acid) for containers. These copolyesters have low permeability. However, because of the high level of modification, these copolyesters are difficult to crystallize. The poor crystallization behavior of these copolyesters makes them difficult to dry and limits the amount of strain induced crystallization that occurs during container fabrication. Low levels of crystallinity in the containers often result in poorer mechanical properties and lower gas barrier.

U.S. Pat. No. 5,239,045 describes copolyesters containing terephthalic acid, ethylene glycol and 0.5 to 4.5 mole % of phenylenedi(oxyacetic acid). The gas barrier properties of these copolyesters are not sufficient to meet the requirements of many container applications including beer and small soft drink containers.

U.S. Pat. No. 4,959,421 describes blends of PET with copolyesters containing isophthalic acid, naphthalenedicarboxylic acid and phenylenedi(oxyacetic acid). In these gas barrier materials disclosed in the above-described specification, however, the barrier level is low and in order to produce a container having a sufficient gas barrier property, it is necessary to make the barrier layer thick. The total thickness of the container is, therefore, inconveniently increased. In addition, the copolyesters in the above-described specification are immiscible with PET; thus, blends of the copolyesters with PET can be hazy which is undesirable in many container applications.

The above-mentioned prior art polyesters and copolyesters comprising phenylenedi(oxyacetic acid) exhibit poor crystallinity and gas barrier properties. The present invention overcomes the problems of poor crystallization and/or gas barrier properties by providing a novel copolyester blend containing phenylenedi(oxyacetic acid) with improved gas barrier properties.

SUMMARY OF THE INVENTION

The present invention provides for copolyester blend compositions, methods of making, and articles of manufacture thereof.

In one embodiment, the invention provides polyester blends comprising:

I. from about 5 to about 85 weight % of a copolyester which is the reaction product of components comprising:
  (A) a repeat unit of a dicarboxylic acid component comprising
    (i) from about 5 to about 99 mole % of a phenylenedi (oxyacetic acid) represented by the formula (I):

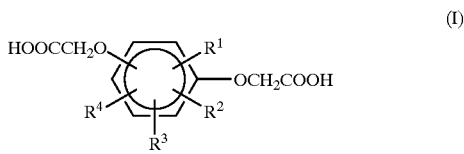

(I)

wherein $R^1, R^2, R^3$ and $R^4$ each independently represents a hydrogen atom, an alkyl group having from 1 to 6 carbon atoms, an alkoxy group having from 1 to 6 carbon atoms, a phenyl group, a chlorine atom, a bromine atom, or a fluorine atom, or an ester derivative of phenylendi(oxayacetic acid) of the formula I;
    (ii) from about 1 to about 95 mole % of a repeat unit of a second diacid comprising terephthalic acid, isophththalic acid, naphthalenedicarboxylic, or cyclohexanedicarboxylic acid, or ester thereof, or mixture thereof; and
  (B) a repeat unit of a diol containing up to 24 carbon atoms; and
I. from about 95 to about 15 weight % of a thermoplastic polyester of poly(ethylene terephthalate), a copolyester of poly(ethylene terephthalate) modified with from greater than 0 to about 70 mole % of a glycol comprising diethylene glycol, propanediol, butanediol, hexanediol or 1,4-cyclohexanedimethanol, and/or a dicarboxylic acid comprising isophthalic acid or naphthalenedicarboxylic acid, or a mixture of the poly (ethylene terephthalate) copolyester with poly(ethylene terephthalate);

from about 95 to about 15 weight % of a polyester of poly(ethylene naphthalate), a copolyester of poly (ethylene naphthalate) modified with from greater than 0 to about 30 mole % a glycol comprising diethylene glycol, propanediol, butanediol, hexanediol or 1,4-cyclohexanedimethanol, and/or a dicarboxylic acid comprising isophthalic acid or terephthalic acid, or a mixture of the poly(ethylene naphthalate) copolyester with poly(ethylene naphthalate);

from about 95 to about 15% weight of poly(butylene terephthalate);

from about 95 to about 15 weight % of poly (trimethylene terephthalate); or from about 95 to about 15% weight % of poly(butylene naphthalate).

In another embodiment, the invention provides a method of producing a polyester blend comprising:

blending from about 5 to about 85 weight % of a copolyester I and from about 95 to about 15 weight % of polyester II, wherein polyester I comprises:
(A) a repeat unit of from about 5 to 99 mole % of phenylenedi(oxyacetic acid) represented by the formula (I):

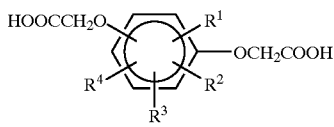

(I)

wherein $R^1, R^2, R^3$ and $R^4$ each independently represents a hydrogen atom, an alkyl group having from 1 to 6 carbon atoms, an alkoxy group having from 1 to 6 carbon atoms, a phenyl group, a chlorine atom, a bromine atom, or a fluorine atom, or an ester derivative of phenylenedi(oxyacetic acid) of the formula I;
(ii) from about 1 to about 95 mole % of a repeat unit of a second diacid comprising terephthalic acid, isophththalic acid, naphthalenedicarboxylic acid, or cyclohexanedicarboxylic acid, or ester thereof, or mixture thereof; and
(B) a repeat unit of a diol containing up to 24 carbon atoms; and polyester II comprises a thermoplastic polyester of poly(ethylene terephthalate), a copolyester of poly(ethylene terephthalate) modified with from greater than 0 to about 70 mole % of a glycol comprising diethylene glycol, propanediol, butanediol, hexanediol or 1,4-cyclohexanedimethanol, and/or a dicarboxylic acid comprising isophthalic acid or naphthalenedicarboxylic acid, or a mixture of the poly(ethylene terephthalate) copolyester with poly(ethylene terephthalate);

a polyester of poly(ethylene naphthalate), a copolyester of poly(ethylene naphthalate) modified with from greater than 0 to about 30 mole % of a glycol comprising diethylene glycol, propanediol, butanediol, hexanediol, or 1,4-cyclohexanedimethanol, and/or a dicarboxcylic acid comprising isophthalic acid or terephthalic acid, or a mixture of the poly(ethylene naphthalate) copolyester with poly(ethylene naphthalate);

a poly(butylene terephthalate);

a poly(trimethylene terephthalate); or a poly(butylene naphthalate).

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention as claimed.

DETAILED DESCRIPTION OF THE INVENTION

The present invention may be understood more readily by reference to the following detailed description of preferred embodiments of the invention and the examples therein.

It must be noted that, as used in the specification and the appended claims, the singular forms "a," "an" and "the" include plural referents unless the context clearly dictates otherwise.

Ranges are often expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment.

A weight percent of a component, unless specifically stated to the contrary, is based on the total weight of the formulation or composition in which the component is included.

With respect to the polyesters, the mole % are based on 100 mole % diacid and 100 mole % diol, for a total of 200 mole %.

"Optional" or "optionally" means that the subsequently described event or circumstance may or may not occur, and that the description includes instances where said event or circumstances occurs and instances where it does not. For example, the phrase "optionally substituted lower alkyl" means that the alkyl group may or may not be substituted and that the description includes both unsubstituted lower alkyl and lower alkyl where there is substitution.

The term "adjacent" means that the layers in the multi-layered structure are in close proximity to one another, and may or may not imply that the layers are in direct contact with the one another.

The term "contact" means that the layers in the multi-layered structure are touching one another, and are not separated by a intermediate layer(s).

Preferred phenylenedi(oxyacetic acids) of formula (I) include 1, 2-phenylenedi(oxyacetic acid), 1, 3-phenylenedi(oxyacetic acid), 1, 4-phenylenedi(oxyacetic acid), 2-methyl-1, 3-phenylenedi(oxyacetic acid), 5-methyl-1,3-phenylenedi(oxyacetic acid), 4-methyl-1,3-phenylenedi(oxyacetic acid), 5-ethyl-1-3,phenylenedi(oxyacetic acid), 4-ethyl-1, 3 phenylenedi(oxyacetic acid), 5-methoxy-1,3 phenylenedi(oxyacetic acid), 4-methoxy- 1,3 phenylenedi(oxyacetic acid), 4-chloro-1,2-phenylenedi(oxyacetic acid), or 4-chloro-1,3-phenylenedi(oxyacetic acid), or an ester thereof.

An even more preferred phenylenedi(oxyacetic acid) of formula (I) includes a derivative of 1,2-phenylenedi(oxyacetic acid)1,3-phenylenedi(oxyacetic acid), or 1,4-phenylenedi(oxyacetic acid), or an ester thereof.

Phenylenedi(oxyacetic acids) as the dicarboxylic acid component (IA) in the present invention may be used as a raw material of a copolyester of the present invention either in the form of an acid itself or in the form of an ester forming derivative such as an acid halide and an ester, in particular, an ester forming derivative such as a C1–4 alkyl phenylenedi(oxyacetic acid) ester. Alternatively, an oligomer obtained by reacting a phenylenedi(oxyacetic acid) with a glycol may be used for polymerization.

The copolyester component I is present in the range of from about 5 to about 85 weight % of the blend composition, more preferably from about from about 5 to about 60 weight % of the blend composition, most preferably from about 5 to about 40 weight % of the blend composition.

As the diol component (IB) for a copolyester of the present invention, typical diols include ethylene glycol, 1,2-propanediol, 1,3-propanediol, 1,4-butanediol, pentamethylene glycol, hexamethylene glycol, neopentyl glycol, cyclohexanedimenthanol, 1,3 bis (2-hydroxyethoxy) benzene, diethylene glycol, or a derivative of an aromatic dihydroxy compound. A preferable diol component is ethylene glycol, and a typical aromatic dihydroxy derivative includes resorcinol, hydroquinone, Bisphenol A, or Bisphenol S.

The polyester component II is present in the range of from about 95 to about 15 weight % of the blend composition, more preferably from about 95 to about 40 weight %, most preferably from about 95 to about 60 weight % of the blend composition.

A copolyester of the present invention may contain a polyfunctional compound such as trimethylolpropane, pentacrythritol, glycerin, trimellitic acid, trimesic acid, or pyromellitic acid, or a monofunctional compound such as o-benzoylbenzoic acid in the range which does not impair the effect of the present invention.

The polyfunctional or monofunctional compound may be added to the resultant copolyester blend comprising phenylenedi(oxyectic acid), or the polyfunctional or multifunctional compound may be employed as an additional monomeric component to form the copolyester of phenylenedi(oxyacetic acid). Such a polyfunctional or monofunctional compound is preferably used in the range of not more than 20 mole % of the diol component (B).

The polyesters (I or II) of the present invention preferably have an intrinsic viscosity of from about 0.4 to 2.0, preferably from about 0.50 to about 1.2 [measured at 25° C. by using a mixed solvent of phenol and tetrachloroethane (in a weight ratio of 60:40)]. If the intrinsic viscosity is less than 0.4, the strength of the polyester obtained is so low that it is impossible to obtain practically necessary physical properties when the polyester is taken out of the reaction vessel after polymerization and cut into chips, or molded into a container such as a bottle, barrel and can be blended with poly(ethylene terephthalate) or laminated on poly(ethylene terephthalate). On the other hand, if the intrinsic viscosity exceeds 2.0, the melting viscosity becomes so high as to make molding such as injection, extrusion or blowing difficult.

The preparation of phenylenedi(oxyacetic acid ) monomers is disclosed in U.S. Pat. No 4,935,540, the teachings of which are incorporated hereinb by reference.

The polyesters (I or II) of the present invention can be produced by any polymerization method that is conventionally known for a polymerization method for poly(ethylene terephthalate). For example, a polycondensation method may be adopted, which the method comprises the steps of directly esterifying terephthalic acid and a phenylenedi (oxyacetic acid) represented by the formula [I] such as 1,3-phenylenedi (oxyacetic acid) and ethylene glycol under a pressure and thereafter gradually reducing the pressure while raising the temperature to polycondense the reaction product. It is also possible to produce a copolyester of the present invention by subjecting an ester derivative of terephthalic acid such as dimethyl terephthalate, an ester derivative of a phenylenedi(oxyacetic acid) represented by the general formula [I] such as dimethyl 1,3-phenylenedi(oxyacetate) and ethylene glycol to an ester exchange reaction, and further polycondensing the reaction product.

In the production of such a polymer (I or II), it is preferable to use an esterifying catalyst, ester exchanging catalyst, polycondensing catalyst, stabilizer, etc.

As the ester exchanging catalyst, at least one known compound selected from calcium, manganese, zinc, sodium and lithium compounds is usable. From the point of view of transparency, a manganese compound if more preferable. As the polycondensing catalyst, at least one known compound selected from antimony, germanium, titanium and cobalt compounds is usable. Antimony, germanium and titanium compounds are preferably used.

A copolyester of the present invention may be subjected to heat treatment, if necessary, before use so as to reduce acetaldehyde or increase molecular weight.

The heat treatment is preferably carried out at 30° C. to a temperature directly below the melting point, for several to several hundred hours. The solid-state polymerization is preferably carried out to 120° C. to a temperature directly below the melting point, preferably 140° to 220° C. for several hours preferably 5 to 30 hours after the surfaces of the chips are crystallized at a temperature of 80° to 200° C.

The copolyester of phenylenedi(oxyacetic acid) and the thermoplastic polyester are blended by using conventional melt blending equipment such as Brabender extruder equipment, single-screw extruders, twin-screw extruders and the like. The blends are generally processed at temperatures in the range of about 240° C. to about 330° C. Properties of the blends may be altered significantly depending on the mixing temperature and mixing time. Generally, processing times in the range of 0.4 to about 5 minutes are useful to achieve the desired results.

Conventionally known additives include, but are not limited to and additive of an antioxidant, ultraviolet absorber, fluorescent brightener, mold release agent, antistatic agent, dispersant, reheat enhancing aid, acetaldehyde reducing additive, nanoparticle, or a coloring agent such as a dye or a pigment, or a mixture thereof may be added, if necessary, to a polyester blend in the present invention at any manufacturing stage. Alternatively, such an additive may be added before molding by what is called master batching. Additives may be added in any amount and combination so long as they do not detract from the purpose (s) of the present invention.

A copolyester blend of the present invention may be subjected to heat treatment, if necessary, before use so as to reduce acetaldehyde or to increase the molecular weight. Alternatively, a copolyester blend of the present invention may also be subjected to solid-state polymerization before use so as to enhance the polymerization degree, reduce acetaldehyde or lower the oligomerization degree.

The heat treatment is preferably carried out at 30° C. to a temperature directly below the melting point, for several to several hundred hours. The solid-state polymerization is preferably carried out from 120° C. to a temperature directly below the melting point, preferably 140° to 230° C. for less than several hours preferably 5 to 30 hours after the surfaces of the chips are crystallized at a temperature of 80° to 200° C.

The copolyester blend compositions of the present invention can be crystallized and dried prior to processing to remove moisture in order to prevent degradation during processing. The copolyester blend compositions are crystallized at a temperature of 80° to 200° C. The copolyester blend compositions are dried in either an inert atmosphere, dry air atmosphere or under reduced pressure at 30° to 200° C. for several to several hundred hours. Preferably, the copolyester blend compositions are dried at 80° to 180° C. for 2 to 40 hours.

In order to produce a hollow molded product of the copolyester blend of the present invention, for example, a blow molding method such as a hot parison process or a cold parison process is adopted in which a preform is first produced by ordinary extrusion blow molding, injection blow molding, injection molding or extrusion molding, and the thus obtained preform is reheated and biaxially stretched.

It is also possible to form a uniaxially or biaxially stretched film from a copolyester blend of the present invention or a can-shaped container, a tray or the like by vacuum forming or air-pressure forming after it is formed into a sheet by injection molding. It is also possible to form a copolyester blend of the present invention into a multi-layered sheet of the copolyester blend and poly(ethylene terephthalate), for example, by a multi-layer extruder and thereafter form the sheet into a uniaxially or biaxially stretched film, a can-shaped container or a tray.

A copolyester blend composition of the present invention can be formed into a film, sheet, container, or bottle, or other packaging material by a melt molding method which is generally used in molding poly(ethylene terephthalate). The copolyester blend composition is usable as a material having a high gas barrier property in an unstretched state. By stretching the copolyester blend composition at least uniaxially, it is possible to improve the gas barrier property and the mechanical strength.

A stretched sheet of a copolyester blend composition of the present invention is produced by stretching a copolyester blend composition of the present invention which has been formed into a sheet by injection molding or extrusion molding. The stretching method adopted may be freely selected from uniaxially stretching, sequential biaxially stretching and simultaneous biaxially stretching. It is also possible to form a stretched sheet of a copolyester blend composition of the present invention into a cup or a tray by air-pressure forming.

When a stretched sheet of a polyester blend composition of the present invention is produced, the stretching temperature is set between the glass transition point (Tg) of the copolyester and a temperature 70° C. higher than the glass transition point (Tg) as in the case of producing a stretched sheet of a copolyester of the present invention. The stretching ratio is ordinarily 1.1 to 10 times, preferably 1.1 to 8 times in the case of uniaxial stretching, and 1.1 to 8 times, preferably 1.1 to 5 times in both machine and transverse directions in the case of biaxial stretching. The thus obtained stretched sheet of a copolyester blend composition of the present invention is excellent in transparency, gas barrier property and mechanical strength and is useful as a packaging material in the form of a film, a cup or a tray.

A copolyester hollow molded product of the present invention is produced by stretching and blowing the preform produced from a copolyester blend composition of the present invention. It is, therefore, possible to use an apparatus conventionally used in the blow molding of polyethylene terephthalate. More specifically, a blow molding method such as a hot parison process or a cold parison process is adopted in which a preform is first produced by a ordinary extrusion blow molding, injection blow molding, injection molding or extrusion molding, and the thus obtained preform is reheated and biaxially stretched as it is often processing the mouth portion and the bottom portion. The stretching temperature is 70° to 120° C., preferably 80° to 110° C., and the stretching ratio is 1.5 to 3.5 times in the machine direction and 2 to 5 times in the hoop direction.

In another embodiment, the invention provides a multi-layered structure comprising a first layer, and a barrier layer of the copolyester blend composition of phenylenedi (oxyacetic acid). In this embodiment, the barrier layer is adjacent to, preferably in contact with, the first layer. The first layer may also be referred to as the main layer, inner layer, or innermost layer, and the barrier layer may also be referred to as the intermediate or internal layer.

In a multi-layered structure, the first layer is typically formed from a polyester or copolyester of poly(ethylene terephthalate), and the barrier layer is formed from the copolyester blend of phenylenedi(oxyacetic acid).

Additional layers in the multi-layered structure may contain the same composition as the first layer, and may be referred to as the second, third, fourth, etc. layers.

Additional barrier layers in the multi-layered structure may contain the same copolyester blend of phenylenedi (oxyacetic acid) as the first barrier layer, and may be referred to as the second, third, fourth, etc. barrier layers.

Further additional layers may include an outermost layer and and/or a protective layer. The outermost layer is formed from a polyester of poly(ethylene terephthalate), or the copolyester blend of phenylenedi(oxyacetic acid). The protective layer is adjacent to the outermost layer in the multi-layered structure. The protective layer may be formed from a polymer, an organic coating, or an inorganic coating, preferably polypropylene, an epoxy coating, or a silica or aluminum based coating, or the like.

When a copolyester hollow molded product is produced, it is possible to first form a preform of a laminate comprising a layer of a copolyester blend composition of the present invention and a layer of polyalkylene terephthalate mainly containing polyethylene terephthalate, and biaxially blow the thus obtained preform in order to produce a multi-layered hollow container. In this case, the structure of the multilayer is not restricted, but a multilayer of three to five layers is preferable.

Especially, a multi-layered structure of at least one layer of the copolyester blend composition of the present invention and at least one polyester layer containing polyethylene terephthalate as the main component (hereinafter referred to as the "PET layer or the first layer") is preferable.

The polyester of the polyester layer in the present invention may be poly(ethylene terephthalate), a copolyester of poly(ethylene terephthalate) modified with from greater than 0 to about 70 mole % of isophthalic acid, cyclohexanedi-carboxylic acid, cyclohexanedimethanol, and/or diethylene glycol, or a mixture thereof, or a polyester of poly(ethylene naphthalate), a copolyester of poly(ethylene naphthalate) modified with from greater than 0 to about 20 mole % of terephthalic acid or polycarbonate. Preferably, the polyester of the polyester layer in the present invention is a polyester of poly(ethylene terephthalate). It is preferable that at least 80 mole % of the structural unit of the polyester is ethylene terephthalate units, and it is possible to use a dicarboxylic acid such as phthalic acid, isophthalic acid, hexahydro-phthalic acid, phenylene di(oxyacetic acid) naphthalene-dicarboxylic acid, succinic acid, adipic acid, or sebacic acid and a polyfunctional carboxylic acid such as trimellitic acid and pyromellitic acid as an acid component in the range of from greater than 0 to about 20 mole % of the total acid component.

It is possible to use a glycol such as 1,2-propanediol, 1,3-propanediol, 1,4-butanediol, 1,6-hexanediol, neopentyl glycol, diethylene glycol, triethylene glycol and cyclohexanedimethanol, or a polyvalent alcohol such as trimethylolpropane, triethylolpropane or pentaerythritol in the range of from greater than 0 to about 20 mole % of the total alcohol component.

The intrinsic viscosity of the polyester containing poly(ethylene terephthalate) as the first layer is preferably 0.6 to 1.2 [measured at 25° C. by using a mixed solvent of phenol and tetrachloroethane (in a weight ration of 60:40)], and the glass transition point (Tg) thereof is preferably 70° to 80° C.

The polyester may be blended with another polyester and used as a polyester layer. In this case, the content of poly(ethylene terephthalate) in the polyester layer if preferably not less than 50%.

The polyester layer containing poly(ethylene terephthalate) as the first layer can be produced by a known polymerization method as in the polyester blend of the present invention. The polyester may be subjected to solid-state polymerization, if necessary. The solid-state polymerization is ordinarily carried out at 170° C. to a temperature directly below the melting point of the polyester, preferably 183° to 230° C. for less than several hours, preferably not less than 5 hours.

A multi-layered copolyester hollow container according to the present invention is produced by forming a preform of a multi-layered hollow container from a copolyester blend composition and a polyester containing poly(ethylene terephthalate) as the first layer which are obtained in the above described method, and stretching the thus obtained preform at a temperature above glass transition point (Tg) of the copolyester at least in the biaxial direction. The multi-layer may be composed of either two layers or not less than three layers. A multilayer of three to five layers is preferable. In this case, it is preferable that the inside layer of the hollow container is a polyester layer. The outermost layer of the hollow container may be the copolyester blend composition containing phenylenedi(oxayacetic acid), or poly(ethylene terephthalate), but polyethylene terephthalate is preferable in terms of surface strength. When the outermost layer is composed of the copolyester blend composition containing phenylenedi(oxyacetic acid), a protective layer may be provided on the outside of the outermost layer for the purpose of protecting the surface. The protective layer may be formed at a stage for forming the preform of the hollow container. Alternatively, the protective layer may be formed after the preform is stretched so as to produce the hollow container by labeling or the like.

The thickness of the polyester layer and the thickness of the copolyester blend layer are not specified. Generally, the total thickness of the bottle body is 200 to 700$\mu$, preferably 250 to 600$\mu$. The thickness of the copolyester blend composition layer is different depending upon the desired barrier property, but it is generally 5 to 300$\mu$, preferably 10 to 200 $\mu$.

A container of the present invention is produced by extrusion blow molding or biaxial orientation blow molding which is conventionally known. Biaxial orientation blow molding is more advantageous. In the case of using biaxial orientation blow molding, the preform of the hollow container is formed, and after the preform is heated to the stretching temperature, it is stretched within a blow mold.

In order to form a preform of the hollow container having a multi-layer structure, a bottomed preform may be formed by injection molding, or after a multi-layered pipe is formed, one end thereof may be formed into a bottom. When a preform of a hollow container having a multi-layer structure or a multi-layered pipe is produced, the layers may be formed sequentially from the innermost layer by an ordinary injection molding machine or a molding machine having a plurality of melt injection apparatuses, or the respective layers may be extruded from a plurality of injecting apparatuses into a single mold one by one, so that the poly(ethylene terephthalate) resin injected first may constitute the innermost layer and the outermost layer, and the copolyester blend composition injected later constitutes a barrier or intermediate layer. By selecting the injection timing, it is possible to design the preform so as to have three layers, five layers or more.

The preform of the hollow container obtained is generally heated in a heating zone having a heater such as a block heater and an infrared heater for the subsequent stretching process. The heating temperature for the preform for a copolyester multi-layered hollow container of the present invention is determined by the glass transition temperature (hereafter referred to as "Tg") of the polyester layer. The heating temperature is preferably in the range of Tg+5° C. to Tg+80° C. If the heating temperature is too low, micro voids are produced due to a cold stretching and the container unfavorably presents the pearl or foggy appearance. On the other hand, if the heating temperature is too high, the preform becomes too soft to obtain a hollow container having a sufficient stretching effect.

When the preform of a copolyester multi-layered hollow container is stretched to form the hollow container, the preform is preferably stretched by 1 to 4 times in the machine direction and by 2 to 6 times in the transverse direction (hoop direction of the container) by moving a rod in the machine direction and blowing pressurized air. In order to enhance the heat resistance of the container, it is possible to heat set the container by further heating the stretched hollow container within the mold at a temperature the same as or higher than the stretching temperature for a short time.

The copolyester blend composition of the present invention is useful as a packaging material and can also be widely used as a container, sheet, film, bottle, etc. in the form of a blend or a laminate with other thermoplastic resins.

Particularly, a laminate of the copolyester blend composition of the present invention with poly(ethylene terephthalate) has a low gas permeability, so it can be utilized very advantageously. Such a laminate can also be used together with a gas barrier material such as vinylidene chloride or a saponified ethylene-vinyl acetate copolymer.

A copolyester hollow molded product of the present invention, which has a high mechanical strength as well as excellent transparency and gas barrier property, can be widely used for fresh beverage, flavoring material, oil, alcoholic drink such as beer, wine and sake, and cosmetics. Particularly, the copolyester hollow molded product of the present invention can be used as a small-sized container for carbonated drink, beer, wine or the like, which would not be preserved for a predetermined guaranteed period due to the insufficient gas barrier property by an ordinary biaxially stretched poly(ethylene terephthalate) bottle.

Especially, a copolyester multi-layered hollow container of the present invention has an excellent gas barrier property, a high mechanical strength free from ply separation and an excellent transparency in the external appearance. A copolyester multi-layered hollow container of the present invention can therefore be widely used for fresh beverage, flavoring material, oil, alcoholic drink such as beer, wine and sake, and cosmetics.

Molded articles, such as, but not limited to a bottle, sheet, fiber, film, pipe, preforms, containers formed form any of the copolyester blend compositions disclosed above are also disclosed herein.

EXAMPLES

The following examples are put forth so as to provide those of ordinary skill in the art with a complete disclosure and description of how the copolyester blends claimed herein are made and evaluated, and are intended to limit the scope of what the inventors regard as their invention. Efforts have been made to ensure accuracy with respect to the numbers (e.g. amounts, temperature, etc.) but some errors and deviations should be accounted for. Unless indicated otherwise, parts are parts by weight, temperature is in ° C. or is at room temperature, and pressure is at or near atmospheric.

The present invention will be explained in more detail with reference to the following non-limitative examples.

Inherent viscosity (IhV) measurements were made at 25° C. 0.25 grams of sample were dissolved in 50 ml of a 60/40 (w/w) pentafluorophenol/1,3,5-trichlorobenzene (PFP/TCB) solvent system.

The oxygen permeability of the copolyester blend was determined in cubic centimeters permeating at 1 mil thick, 10 inches square, for a 24-hour period under an oxygen partial pressure difference of one atmosphere at 30° C. using a MOCON Oxtran 100 instrument. The film actually used to measure permeability was 3–8 mils in thickness, but the permeability was converted to a one mil basis using conventional calculations. In like manner, the carbon dioxide permeability of the copolyester blend was determined using a MOCON Permatran C instrument.

Tensile properties were measured on an Instron Universal Testing Machine. The test method used was a modified ASTM D882 for measuring the tensile properties of thin films.

This invention can be further illustrated by the following examples of preferred embodiments thereof, although it will be understood that these examples are included merely for purposes of illustration and are not intended to limit the scope of the invention unless otherwise specifically indicated.

Example 1

A melt blend of poly(ethylene terephthalate) (IhV=0.66 dl/g) and 10 weight % of the poly(ethylene terephthalate-co-ethylene 1,4-phenylenedi(oxyacetate)) containing 20 mole % of 1,4-phenylenedi(oxyacetate) was prepared on a Brabender single screw extruder. The blend was extruded into 5 mil and 20 mil film. The 5 mil amorphous film was characterized for IhV, Tg values, melting point, tensile properties in the machine direction and gas transmission rates. The data is listed in Table 1.

Example 2

The 20 mil film made in Example 1 was biaxially oriented 4× by 4× on a T. M. Long machine at 90° C. The oriented film was characterized for IhV, Tg values, melting point, tensile properties in the machine direction and gas transmission rates. The data is listed in Table 1.

Example 3

The same as example 1 except 20 weight % of the poly(ethylene terephthalate-co-ethylene 1,4-phenylenedi(oxyacetate)) containing 20 mole % of 1,4-phenylenedi(oxyacetate) was used.

Example 4

The 20 mil film made in Example 3 was biaxially oriented 4× by 4× on a T. M. Long machine at 90° C. The oriented film was characterized for IhV, Tg values, melting point, tensile properties in the machine direction and gas transmission rates. The data is listed in Table 1.

Example 5

The same as example 1 except 10 weight % of the poly(ethylene terephthalate-co-ethylene 1,4-phenylenedi(oxyacetate)) containing 50 mole % of 1,4-phenylenedi(oxyacetate) was used.

Example 6

The 20 mil film made in Example 5 was biaxially oriented 4× by 4× on a T. M. Long machine at 90° C. The oriented film was characterized for IhV, Tg values, melting point, tensile properties in the machine direction and gas transmission rates. The data is listed in Table 1.

Example 7

The same as example 1 except 20 weight % of the poly(ethylene terephthalate-co-ethylene 1,4-phenylenedi(oxyacetate)) containing 50 mole % of 1,4-phenylenedi(oxyacetate) was used.

Example 8

The 20 mil film made in Example 7 was biaxially oriented 4× by 4× on a T. M. Long machine at 90° C. The oriented film was characterized for IhV, Tg values, melting point, tensile properties in the machine direction and gas transmission rates. The data is listed in Table 1.

Comparative Example 9

Poly(ethylene terephthalate) was extruded into film and characterized as described in Example 1.

Comparative Example 10

Poly(ethylene terephthalate) 20 mil film was oriented and characterized as described in Example 2.

Comparative Example 11

Poly(ethylene terephthalate-co-ethylene 1,4-phenylenedi(oxyacetate)) containing 20 mole % of 1,4-phenylenedi(oxyacetate) was extruded into film and characterized as described in Example 1.

Comparative Example 12

Poly(ethylene terephthalate-co-ethylene 1,4-phenylenedi(oxyacetate)) containing 20 mole % of 1,4-phenylenedi(oxyacetate) 20 mil film was oriented and characterized as described in Example 2.

TABLE 1

| Run | Ih.V. (dl/g) | Tg (° C.) | Tm (° C.) | $O_2$ Trans Rate (cc-mil/100 in 2–24 hr-atm) | $CO_2$ Trans Rate (cc-mil/100 in 2–24 hr-atm) | Tensl Strngt (MPa) | % Elong. | Tensl Mod (GPa) |
|---|---|---|---|---|---|---|---|---|
| Ex 1 | 0.69 | 74 | 248 | 8.3 | 47 | 44 | 357 | 1.72 |
| Ex 2 | 0.69 | 78 | 247 | 6.4 | 28 | 261 | 86 | 3.52 |
| Ex 3 | 0.66 | 72 | 247 | 7.5 | 42 | 45 | 149 | 1.75 |
| Ex 4 | 0.66 | 76 | 246 | 5.4 | 24 | 210 | 91 | 3.42 |
| Ex 5 | 0.70 | 75 | 248 | 8.4 | 44 | 37 | 301 | 1.96 |
| Ex 6 | 0.70 | 71 | 245 | 4.9 | 19 | 220 | 89 | 3.00 |
| Ex 7 | 0.68 | 72 | 248 | 6.4 | 34 | 38 | 62 | 1.96 |
| Ex 8 | 0.68 | 69 | 246 | 3.6 | 13 | 223 | 87 | 3.28 |
| CE 9 | 0.66 | 72 | 248 | 9.6 | 59 | 46 | 374 | 1.75 |
| CE 10 | 0.66 | 80 | 248 | 8.3 | 34 | 231 | 69 | 3.35 |
| CE 11 | 0.72 | 64 | 228 | 6.3 | 40 | 47 | 3 | 2.01 |
| CE 12 | 0.72 | 70 | 227 | 3.7 | 23 | 251 | 97 | 3.42 |

The invention has been described in detail with particular reference to preferred embodiments thereof, but it will be understood that variations and modifications can be effected within the spirit and scope of the invention.

Thus, the present invention provides a thermoplastic copolyester with reduced permeabilities to gases such as oxygen and carbon dioxide. The copolyester blend compositions described in this invention have unexpectedly lower gas permeability and improved crystallization behavior.

What is claimed is:

1. A polyester blend composition comprising:
   I. from about 5 to about 85 weight % of a copolyester which is the reaction product of components comprising:
      (A) a repeat unit of a dicarboxylic acid component consisting of:
         (i) from about 5 to about 99 mole % of a phenylenedi (oxyacetic acid) represented by the formula (I):

$$\text{HOOCCH}_2\text{O} \underset{R^4}{\overset{R^1}{\underset{R^3}{\bigcirc}}} R^2 \text{OCH}_2\text{COOH} \quad (I)$$

wherein $R^1, R^2, R^3$ and $R^4$ each independently represents a hydrogen atom, an alkyl group having from 1 to 6 carbon atoms, an alkoxy group having from 1 to 6 carbon atoms, a phenyl group, a chlorine atom, a bromine atom, or a fluorine atom, or an ester derivative of phenylenedi(oxyacetic acid) of the formula I;
         (ii) from about 1 to about 95 mole % of a repeat unit of a second diacid consisting of terephthalic acid, naphthalenedicarboxylic or cyclohexanedicarboxylic acid, or ester thereof, or mixture thereof; and
      (B) a repeat unit of a diol containing up to 24 carbon atoms; and
   II. from about 95 to about 15 weight % of a thermoplastic polyester of poly(ethylene terephthalate), a copolyester of poly(ethylene terephthalate) modified with from greater than 0 to about 70 mole % of a glycol comprising diethylene glycol, propanediol, butanediol, hexanediol or 1,4-cyclohexanedimethanol, and/or a dicarboxylic acid comprising isophthalic acid or naphthalenedicarboxylic acid, or a mixture of the poly (ethylene terephthalate) copolyester with poly(ethylene terephthalate);
   from about 95 to about 15 weight % of a polyester of poly(ethylene naphthalate), a copolyester of poly (ethylene naphthalate) modified with from greater than 0 to about 30 mole % a glycol comprising diethylene glycol, propanediol, butanediol, hexanediol or 1,4-cyclohexanedimethanol, and/or a dicarboxylic acid comprising isophthalic acid or terephthalic acid, or a mixture of the poly(ethylene naphthalate) copolyester with poly(ethylene naphthalate);
   from about 95 to about 15% weight % of poly(butylene terephthalate);
   from about 95 to about 15 weight % of poly(trimethylene terephthalate); or
   from about 95 to about 15% weight % of poly(butylene naphthalate).

2. The polyester blend composition of claim 1, wherein formula (I) is 1,2-phenylenedi(oxyacetic acid), 1,3-phenylenedi(oxyacetic acid), 1,4-phenylenedi(oxyacetic acid), 2-methyl-1,3-phenylenedi(oxyacetic acid), 5-methyl-1,3-phenylenedi(oxyacetic acid), 4-methyl-1,3-phenylenedi (oxacetic acid), 5-ethyl-1,3-phenylenedi(oxyacetic acid), 4-ethyl-1,3 phenylenedi(oxyacetic acid), 5-methoxy-1,3 phenylenedi(oxyacetic acid), 4-methoxy-1,3 phenylenedi (oxyacetic acid), 4-chloro-1,2-phenylenedi(oxyacetic acid), or 4-chloro-1,3-phenylenedi(oxyacetic acid), or an ester thereof.

3. The polyester blend composition of claim 1, wherein formula (I) is 1,2-phenylenedi(oxyacetic acid)1,3-phenylenedi(oxyacetic acid), 1,4-phenylenedi(oxyacetic acid), or an ester thereof.

4. The polyester blend composition of claim 1, wherein component II comprises the polyester or copolyester of poly(ethylene terephthalate).

5. The polyester blend composition of claim 1, wherein component II comprises the polyester or copolyester of poly(ethylene naphthalate).

6. The polyester blend composition of claim 1, wherein component II comprises poly(butylene terephthalate).

7. The polyester blend composition of claim 1, wherein component II comprises poly(trimethylene terephthalate).

8. The polyester blend composition of claim 1, wherein component II comprises poly(butylene naphthalate).

9. The polyester blend composition of claim 1, wherein component (IAi) is a C1–4 alkyl of phenylenedi(oxyacetic acid) ester.

10. The polyester blend composition of claim 1, wherein the diol component (IB) comprises ethylene glycol, 1,2- propanediol, 1,3-propanediol, 1,4-butanediol, pentamethylene glycol, hexamethylene glycol, neopentyl glycol, cyclohexanedimethanol, 1,3 bis(2-hydroxyethoxy)benzene, diethylene glycol, or a derivative of an aromatic dihydroxy compound comprising resorcinol, hydroquinone, or Bisphenol A.

11. The polyester blend composition of claim 10, wherein the diol component (IB) is ethylene glycol.

12. The polyester blend composition of claim 1, wherein the blend further comprises a polyfunctional compound comprising trimethylolpropane, pentacrythritol, glycerin, trimellitic acid, trimesic acid, or pyromelletic acid.

13. The polyester blend composition of claim 12, wherein the polyfunctional compound is present in a concentration of not greater than 20 mole % of the diol component (IB).

14. The polyester blend composition of claim 1, wherein the composition has an inherent viscosity of from about 0.4 to about 2.0 as measured at 25° C. in a 60:40 phenol tetrachloroethane solvent.

15. The polyester blend composition of claim 1, wherein the composition has an inherent viscosity of from about 0.5 to about 1.2 as measured measured at 25° C. in a 60:40 phenol tetrachloroethane solvent.

16. An article comprising the polyester blend composition of claim 1.

17. The article of claim 16, wherein the article is a hollow article.

18. The article of claim 16, wherein the article is a uniaxially or biaxially stretched film.

19. The article of claim 16, wherein the article is can-shaped container or tray.

20. The article of claim 16, wherein the article is a bottle.

21. The article of claim 16, wherein the article is a film, sheet, container or packaging material.

22. A method of producing a polyester blend comprising:
blending from about 5 to about 85 weight % of a copolyester I and from about 95 to about 15 weight % of polyester II, wherein polyester I comprises:
(A) a repeat unit of from about 5 to 99 mole % of phenylenedi(oxyacetic acid) represented by the formula (I):

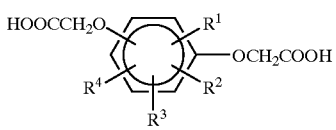

wherein $R^1, R^2, R^3$ and $R^4$ each independently represents a hydrogen atom, an alkyl group having from 1 to 6 carbon atoms, an alkoxy group having from 1 to 6 carbon atoms, a phenyl group, a chlorine atom, a bromine atom, or a fluorine atom, or an ester derivative of phenylenedi(oxyacetic acid) of the formula I;

(ii) from about 1 to about 95 mole % of a repeat unit of a second diacid consisting of terephthalic acid, naphthalenedicarboxylic or cyclohexanedicarboxylic acid, or ester thereof, or mixture thereof; and (B) a repeat unit of a diol containing up to 24 carbon atoms; and polyester II comprises a thermoplastic polyester of poly(ethylene terephthalate), a copolyester of poly(ethylene terephthalate) modified with from greater than 0 to about 70 mole % of a glycol comprising diethylene glycol, propanediol, butanediol, hexanediol or 1,4-cyclohexanedimethanol, and/or a dicarboxylic acid comprising isophthalic acid or naphthalenedicarboxylic acid, or a mixture of the poly(ethylene terephthalate) copolyester with poly(ethylene terephthalate);

a polyester of poly(ethylene naphthalate), a copolyester of poly(ethylene naphthalate) modified with from greater than 0 to about 30 mole % of a glycol comprising diethylene glycol, propanediol, butanediol, hexanediol, or 1,4-cyclohexanedimethanol, and/or a dicarboxylic acid comprising isophthalic acid or terephthalic acid, or a mixture of the poly(ethylene naphthalate) copolyester with poly(ethylene naphthalate);

a poly(butylene terephthalate);

a poly(trimethylene terephthalate); or a poly(butylene naphthalate).

23. The method of claim 22, wherein the blending step is performed in an extruder, or during injection molding.

24. The method of claim 22, wherein the blending step is carried out a temperature of from about 240° C. to about 330° C. for a period of from about 0.4 minutes to about 5 minutes.

25. The method of claim 22, further comprising adding an additive of an antioxidant, ultraviolet absorber, fluorescent brightener, mold release agent, antistatic agent, dispersant, reheat enhancing agent, acetaldehyde reducing additive, nanoparticle or coloring agent, or a mixture thereof.

26. An article made from the polyester blend produced by the method of claim 22.

27. The article of claim 26, wherein the article is a hollow article.

28. The article of claim 26, wherein the article is a uniaxially or biaxially stretched film.

29. The article of claim 26, wherein the article is a can-shaped container or a tray.

30. The article of claim 26, wherein the article is a film, sheet, container or a packaging material.

31. The article of claim 26, wherein the article is a bottle.

* * * * *

UNITED STATES PATENT AND TRADEMARK OFFICE
CERTIFICATE OF CORRECTION

PATENT NO.   : 6,254,950 B1
DATED        : July 3, 2001
INVENTOR(S)  : Rogers et al.

It is certified that error appears in the above-identified patent and that said Letters Patent is hereby corrected as shown below:

Claim 12,
Line 10, change "pentacrythritol" to read -- pentaerythritol --.

Claim 15,
Line 21, change "measured measured" to read -- measured --.

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*